US 11,747,435 B2

(12) United States Patent
Rao et al.

(10) Patent No.: US 11,747,435 B2
(45) Date of Patent: *Sep. 5, 2023

(54) TECHNIQUES FOR ANGLE RESOLUTION IN RADAR

(71) Applicant: Texas Instruments Incorporated, Dallas, TX (US)

(72) Inventors: Sandeep Rao, Bengaluru (IN); Saurabh Khanna, Delhi (IN)

(73) Assignee: Texas Instruments Incorporated, Dallas, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/243,616

(22) Filed: Apr. 29, 2021

(65) Prior Publication Data
US 2021/0247488 A1 Aug. 12, 2021

Related U.S. Application Data

(63) Continuation of application No. 16/857,242, filed on Apr. 24, 2020, now Pat. No. 11,022,675, which is a (Continued)

(30) Foreign Application Priority Data

Oct. 25, 2013 (IN) ............................ 4825/CHE/2013

(51) Int. Cl.
*G01S 7/03* (2006.01)
*G01S 7/35* (2006.01)
(Continued)

(52) U.S. Cl.
CPC .............. *G01S 7/032* (2013.01); *G01S 7/354* (2013.01); *G01S 13/34* (2013.01); *G01S 13/42* (2013.01);
(Continued)

(58) Field of Classification Search
CPC .... G01S 3/16–3/50; G01S 3/74; G01S 7/354; G01S 13/06; G01S 13/42; G01S 13/4418;
(Continued)

(56) References Cited

U.S. PATENT DOCUMENTS 3,982,245 A * 9/1976 Soule, Jr. .............. G01S 7/2813
342/379
4,146,889 A * 3/1979 Brennan .............. H01Q 3/2629
342/380

(Continued)

FOREIGN PATENT DOCUMENTS

CN 101288001 10/2008
CN 101490578 7/2009

(Continued)

OTHER PUBLICATIONS

Notification of First Office Action and Search Report in corresponding Chinese Patent Application No. 201480058752.1, dated May 2, 2017 (4 pages).

(Continued)

*Primary Examiner* — Peter M Bythrow
(74) *Attorney, Agent, or Firm* — Michael T. Gabrik; Frank D. Cimino

(57) ABSTRACT

A radar apparatus for estimating position of a plurality of obstacles. The radar apparatus includes a receive antenna unit. The receive antenna unit includes a linear array of antennas and an additional antenna at a predefined offset from at least one antenna in the linear array of antennas. The radar apparatus also includes a signal processing unit. The signal processing unit estimates an azimuth frequency associated with each obstacle of the plurality of obstacles from a signal received from the plurality of obstacles at the linear array of antennas. In addition, the signal processing unit estimates an azimuth angle and an elevation angle associated (Continued)

with each obstacle from the estimated azimuth frequency associated with each obstacle.

14 Claims, 4 Drawing Sheets

Related U.S. Application Data continuation of application No. 15/702,561, filed on Sep. 12, 2017, now Pat. No. 10,677,890, which is a continuation of application No. 14/329,446, filed on Jul. 11, 2014, now Pat. No. 9,759,807.

(51) Int. Cl.
| | | |
|---|---|---|
| *G01S 13/34* | (2006.01) | |
| *G01S 13/42* | (2006.01) | |
| *G01S 13/931* | (2020.01) | |
| *H01Q 3/26* | (2006.01) | |
| *H01Q 1/32* | (2006.01) | |
| *H01Q 3/24* | (2006.01) | |
| *H01Q 21/08* | (2006.01) | |

(52) U.S. Cl.
CPC ......... *G01S 13/931* (2013.01); *H01Q 1/3233* (2013.01); *H01Q 3/247* (2013.01); *H01Q 3/2629* (2013.01); *H01Q 21/08* (2013.01)

(58) Field of Classification Search
CPC ... G01S 13/4427; H01Q 21/06–21/065; H01Q 21/08; H01Q 21/10; H01Q 25/00; H01Q 3/2629; H01Q 3/2635
See application file for complete search history.

(56) References Cited

U.S. PATENT DOCUMENTS

| | | | | |
|---|---|---|---|---|
| 4,398,197 A * | 8/1983 | Dillard | ............... | H01Q 3/2629 342/379 |
| 4,628,321 A * | 12/1986 | Martin | ............... | H01Q 3/2635 343/779 |
| 5,021,793 A * | 6/1991 | Stangel | ............... | H01Q 3/2629 342/383 |
| 5,152,010 A * | 9/1992 | Talwar | ............... | H01Q 3/2629 455/278.1 |
| 5,493,307 A * | 2/1996 | Tsujimoto | ............ | H01Q 3/2629 342/380 |
| 5,619,206 A | 4/1997 | Cole, Jr. et al. | | |
| 5,652,591 A * | 7/1997 | Liu | ............... | G01S 7/36 342/380 |
| 6,255,991 B1 * | 7/2001 | Hedin | ............... | H01Q 21/293 342/442 |
| 6,289,004 B1 * | 9/2001 | Mesecher | ............ | H01Q 1/246 375/349 |
| 6,489,923 B1 * | 12/2002 | Bevan | ............... | H01Q 1/246 342/378 |
| 6,819,285 B1 * | 11/2004 | Stockman | ............ | G01S 7/4021 342/146 |
| 7,570,197 B2 * | 8/2009 | Takano | ............... | G01S 13/4454 342/195 |
| 7,714,782 B2 * | 5/2010 | Davis | ............... | H01Q 21/22 342/99 |
| 8,049,657 B2 | 11/2011 | Prats et al. | | |
| 8,817,927 B2 * | 8/2014 | Zai | ............... | G01S 7/0232 375/349 |
| 10,677,890 B2 * | 6/2020 | Rao | ............... | G01S 13/931 |
| 2002/0002065 A1 * | 1/2002 | Mesecher | ............ | H04B 1/126 455/560 |
| 2003/0190933 A1 * | 10/2003 | Higbie | ............... | H01Q 3/2635 455/562.1 |
| 2005/0003864 A1 * | 1/2005 | Elliot | ............... | H01Q 3/2629 455/562.1 |
| 2006/0022866 A1 * | 2/2006 | Walton | ............... | H01Q 21/08 342/126 |
| 2006/0246953 A1 * | 11/2006 | Yamamoto | ........... | H04B 7/0814 455/562.1 |
| 2007/0285315 A1 * | 12/2007 | Davis | ............... | H01Q 21/22 342/377 |
| 2008/0291088 A1 | 11/2008 | Nagai | | |
| 2009/0021421 A1 * | 1/2009 | Wakayama | ............ | G01S 7/354 342/175 |
| 2009/0315761 A1 * | 12/2009 | Walter | ............... | G01S 13/931 342/200 |
| 2010/0109938 A1 * | 5/2010 | Oswald | ............... | G01S 13/522 707/E17.014 |
| 2010/0141527 A1 | 6/2010 | Lalezari | | |
| 2010/0231455 A1 * | 9/2010 | Frieaizen | ............ | G01S 3/74 342/445 |
| 2011/0148706 A1 * | 6/2011 | Eom | ............... | H01Q 3/2629 342/372 |
| 2012/0115429 A1 * | 5/2012 | Falk | ............... | G01S 7/0236 455/296 |
| 2013/0176173 A1 * | 7/2013 | Chew | ............... | G01S 7/2813 342/372 |

FOREIGN PATENT DOCUMENTS

| | | |
|---|---|---|
| EP | 2113788 | 11/2009 |
| WO | 2007029519 A1 | 3/2007 |

OTHER PUBLICATIONS

Supplementary European Search Report in corresponding European Application No. EP14855968 dated May 17, 2017 (3 pages).
International Search Report and Written Opinion, PCT/US 2014/058018, dated Jan. 15, 2015, 7 pages.

* cited by examiner

TECHNIQUES FOR ANGLE RESOLUTION IN RADAR

CROSS REFERENCES TO RELATED APPLICATIONS

This application is a continuation of U.S. patent application Ser. No. 16/857,242, filed Apr. 24, 2020, which is a continuation of U.S. patent application Ser. No. 15/702,561, filed Sep. 12, 2017 (now U.S. Pat. No. 10,677,890), which is a continuation of U.S. patent application Ser. No. 14/329,446, filed Jul. 11, 2014 (now U.S. Pat. No. 9,759,807), which application claims priority from India provisional patent application No. 4825/CHE/2013 filed on Oct. 25, 2013, all of which are hereby incorporated by reference in their entirety.

TECHNICAL FIELD

Embodiments of the disclosure relate generally to radars.

BACKGROUND

A vehicle has parking sensors to detect an obstacle behind the vehicle. The parking sensors determine a distance of the vehicle from the obstacle using ultrasonic signals when backing a vehicle. The parking sensor operates at ultrasonic frequencies. The parking sensor outputs an ultrasonic detecting signal to detect whether any obstacle is behind the rear of the vehicle and receives an ultrasonic signal as reply from the obstacle. A vehicle generally requires multiple parking sensors to cover the entire rear of the vehicle which makes it a cost intensive solution. Also, the ultrasonic parking sensors use a time division obstacle detecting method in which each sensor sends and receives ultrasonic detect signal in a defined time slot. Thus, the process of detecting obstacles using ultrasonic sensors is time consuming which is unsafe in vehicles moving with high velocity.

Ultrasonic parking sensors require the measurement and drilling of holes in the vehicle's bumper to install transducers. There are risks associated with drilling and mounting the transducers into the bumper. The performance of the Ultrasonic sensors is sensitive to temperature and atmospheric conditions such as snow and rain. The performance of ultrasonic sensors is severely degraded when the sensors are covered with snow. In addition, the range over which the ultrasonic sensors operates is limited.

The use of radars in automotive applications is evolving rapidly. Radars do not have the drawbacks discussed above in the context of ultrasonic sensors. Radar finds use in number of applications associated with a vehicle such as collision warning, blind spot warning, lane change assist, parking assist and rear collision warning. Pulse radar and FMCW (Frequency Modulation Continuous Wave) radar are predominantly used in such applications. In the pulse radar, a signal in the shape of a pulse is transmitted from the radar at fixed intervals. The transmitted pulse is scattered by the obstacle. The scattered pulse is received by the radar and the time between the transmission of the pulse and receiving the scattered pulse is proportional to a distance of the radar from the target. For better range resolution, a narrower pulse is used which requires a high sampling rate in an ADC (analog to digital converter) used in the pulse radar. In addition, sensitivity of a pulse radar is directly proportional to the power which complicates the design process of the pulse radar.

In an FMCW radar, a transmit signal is frequency modulated to generate a transmit chirp. An obstacle scatters the transmit chirp. The scattered chirp is received by the FMCW radar. A signal obtained by mixing the transmitted chirp and the received scattered chirp is termed as a beat signal. The frequency of the beat signal is proportional to the distance of the obstacle from the FMCW radar. The beat signal is sampled by an analog to digital converter (ADC). A sampling rate of the ADC is proportional to the maximum frequency of the beat signal and the frequency of the beat signal is proportional to the range of the farthest obstacle which can be detected by the FMCW radar. Thus, unlike in the pulse radar, the sampling rate of the ADC in the FMCW radar is independent of the range resolution.

Typically in an FMCW radar, multiple chirps are transmitted in a unit called as frame. A 2-dimensional (2D) FFT is performed on the sampled beat signal data received over a frame for range and relative velocity estimation of the obstacle. A bin is a 2D FFT grid that corresponds to a range and relative velocity estimate of an obstacle. A signal detected in a specific bin represents the presence of an obstacle with a predefined range and relative velocity. When multiple receive antennas are used to receive the scattered chirp, the FMCW radar estimates an elevation angle of the obstacle and an azimuth angle of the obstacle. In each frame, a 2D FFT is computed using the data received from each receive antenna. Thus, the number of 2D FFT's is equal to the number of the receive antennas. When an obstacle is detected in a specific bin of the 2D FFT grid, the value of the specific bin corresponding to each of the receive antennas is used to estimate the azimuth angle and the elevation angle of the obstacle.

The FMCW radar resolves obstacles in the dimensions of range, relative velocity and angle. To accurately estimate position of the obstacle, it is required that the obstacle is resolved in any one of these dimensions. Thus, if there are multiple obstacles at the same distance from the FMCW radar and travelling with same relative velocity, the FMCW radar is required to resolve these obstacles in angle dimension. Thus, angle estimation is an important factor in determining the performance of the FMCW radar. The resolution and accuracy of the angle estimation is directly proportional to the number of antennas unit in the FMCW radar. As FMCW radars are used in a broad range of applications, their design becomes more cost-sensitive. Each antenna used to receive the scattered chirp has a distinct receiver path which includes amplifiers, mixers, ADCs and filters. Thus, the number of antennas used in the FMCW radar is a key factor in determining the overall cost of the FMCW radar. Therefore it is important to minimize the number of antennas and processing requirements of the FMCW radar and at the same time maintaining optimum performance level and accuracy.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a radar apparatus for estimating position of a plurality of obstacles. The radar apparatus includes a receive antenna unit. The receive antenna unit includes a linear array of antennas and an additional antenna at a predefined offset from at least one antenna in the linear array of antennas. The radar apparatus also includes a signal processing unit. The signal processing unit estimates an azimuth frequency associated with each obstacle of the plurality of obstacles from a signal received from the plurality of obstacles at the linear array of antennas. The signal processing unit also estimates a complex amplitude associated with each obstacle from the estimated azimuth frequency associated with the plurality of obstacles and from the signal received from the plurality of obstacles at the linear array of antennas. The signal processing unit estimates a complex phasor associated with each obstacle from the estimated complex amplitude associated with the plurality of obstacles and from a signal received from the plurality of obstacles at the additional antenna. In addition, the signal processing unit estimates an azimuth angle and an elevation angle associated with each obstacle from the estimated complex phasor associated with each obstacle and from the estimated azimuth frequency associated with each obstacle.

Another embodiment provides a method of estimating position of a plurality of obstacles using a radar apparatus. The method includes estimating an azimuth frequency associated with each obstacle of the plurality of obstacles from a signal received from the plurality of obstacles at the radar apparatus. A complex amplitude associated with each obstacle is estimated from the estimated azimuth frequency associated with the plurality of obstacles and from the signal received from the plurality of obstacles at the radar apparatus. A complex phasor associated with each obstacle is estimated from the estimated complex amplitude associated with the plurality of obstacles and from the signal received from the plurality of obstacles at the radar apparatus. An azimuth angle and an elevation angle associated with each obstacle are estimated from the estimated complex phasor associated with each obstacle and from the estimated azimuth frequency associated with each obstacle.

Additionally, an embodiment provides a radar apparatus for estimating position of a plurality of obstacles. The radar apparatus includes a transmit antenna unit. A transmitter is coupled to the transmit antenna unit and generates the outbound RF (radio frequency) signal. The radar apparatus also includes a receive antenna unit. A receiver is coupled to the receive antenna unit and receives the inbound RF signal from the receive antenna unit. The outbound RF signal is scattered by the plurality of obstacles to generate the inbound RF signal. A mixer is coupled to the receiver and to the transmitter and demodulates the inbound RF signal to generate a demodulated signal. An analog to digital converter (ADC) is coupled to the mixer and generates a digital signal in response to the demodulated signal received from the mixer. An FFT (fast fourier transform) module coupled to the ADC and transforms the digital signal from a time domain to a frequency domain. A signal processing unit is coupled to the FFT module and processes the digital signal. The signal processing unit estimates an azimuth frequency associated with each obstacle of the plurality of obstacles from the digital signal. The signal processing unit also estimates a complex amplitude associated with each obstacle from the estimated azimuth frequency associated with the plurality of obstacles and from the digital signal. A complex phasor associated with each obstacle is estimated from the estimated complex amplitude associated with the plurality of obstacles. An azimuth angle and an elevation angle associated with each obstacle are estimated from the estimated complex phasor associated with each obstacle and from the estimated azimuth frequency associated with each obstacle.

Other aspects and example embodiments are provided in the Drawings and the Detailed Description that follows.

BRIEF DESCRIPTION OF THE VIEWS OF DRAWINGS

FIG. 2(c)-1-FIG. 2(c)-3 illustrate beam-width of a transmit antenna unit in a radar apparatus; and FIG. 3 illustrates a radar apparatus, according to an embodiment.

DETAILED DESCRIPTION OF THE EMBODIMENTS

Figure 1:
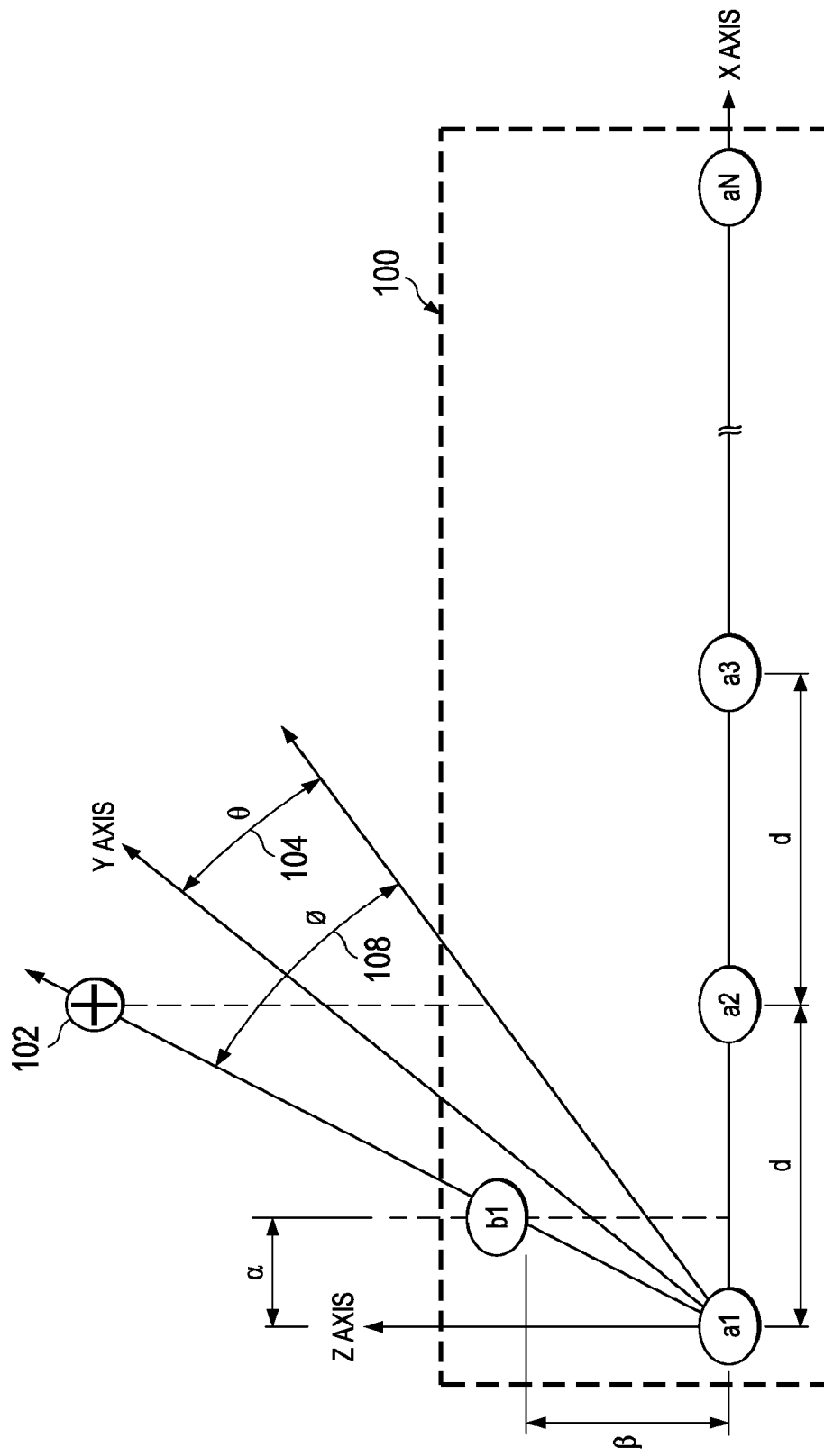
FIG. 1 illustrates a receive antenna unit in a radar apparatus, according to an embodiment.

FIG. 1 illustrates a receive antenna unit 100 in a radar apparatus, according to an embodiment. In an embodiment, the receive antenna unit 100 is integrated in a radar apparatus which is further integrated in an industrial or automotive application. The receive antenna unit 100 includes a linear array of antennas. The linear array of antennas includes a plurality of antennas, for example, antenna a1, a2, a3 and aN, where aN is the $N^{th}$ antenna and N is an integer. For the sake of simplicity and understanding, the plurality of antennas represented in FIG. 1 will be represented as a1-aN further in the description. The linear array of antennas a1-aN is represented to be placed along the X-axis. The adjacent antennas in the linear array of antennas a1-aN are separated by a spacing d i.e. the antennas a1 and a2 are placed at distance from each other.

The receive antenna unit 100 further includes an additional antenna b1. The additional antenna b1 is at a predefined offset from at least one antenna in the linear array of antennas a1-aN. The predefined offset is (α, β) from the antenna a1 in the linear array of antennas a1-aN as illustrated in FIG. 1. α is a distance of the additional antenna b1 from the Z axis and β is a distance of the additional antenna b1 from the X axis. In one embodiment, the additional antenna is not in XZ plane and a perpendicular distance of the additional antenna b1 from the XZ plane is γ. In one embodiment, the predefined offset is a multiple of λ/2, where λ is an operating wavelength of the receive antenna unit 100. In an embodiment, d is λ/2, α is λ/4, β is λ/2 and γ is 0. In an embodiment, the spacing d between antennas in the linear array of antennas is a multiple of λ/2.

For ease of understanding, we consider an embodiment in which the linear array of antennas consists of three antennas (a1, a2 and a3). The equation 1 below is a mathematical representation of the signal received at the receive antenna unit 100 from an obstacle 102. It is to be noted that the signal 'r' represented in equation 1 depicts a signal obtained after a signal processing unit processes the signal received at the receive antenna unit 100. In an embodiment, the signal 'r' depicts a signal obtained after performing 2D FFT on the signal received at each antenna in the receive antenna unit 100 from the obstacle.

$$r = A[1 \ e^{-jw_x} e^{-j2w_x} e^{-j\psi}] \quad (1)$$

where, $w_x$ is azimuth frequency. A is the complex amplitude corresponding to the obstacle. ψ is the phase at the additional antenna b1 and is given by $$\psi = w_z + \frac{\alpha}{d} w_x$$

where, $w_z$ is elevation frequency. $w_x$ and $w_z$ are defined as:

$$w_x = \frac{2\pi}{\lambda} d\sin(\theta)\cos(\phi) \quad (2)$$

$$w_z = \frac{2\pi}{\lambda} \beta\sin(\phi) \quad (3)$$

In equation 1, the component $e^{-jw_x}$ represents a factor as a result of the antenna a1, the component $e^{-j2w_x}$ represents a factor as a result of the antenna a2 and the component $e^{-j\psi}$ represents a factor as a result of the antenna b1. An angle 104 (θ) represents an azimuth angle between the obstacle 102 and the antenna unit 100 and an angle 108 (Φ) represents an elevation angle between the obstacle 102 and the antenna unit 100. The azimuth angle (θ) 104 is an angle between the Y axis and the projection of a vector from antenna a1 to the obstacle 102 on the XY plane. The elevation angle (Φ) 108 is an angle between a vector from antenna a1 to the obstacle 102 and the XY plane. The receive antenna unit 100, in an embodiment, is used to estimate position of a plurality of obstacles at a fixed distance from the receive antenna unit 100 and having same relative velocity with respect to the radar apparatus. In one example, the receive antenna unit 100 is used to estimate the position of a plurality of obstacles which are at different distances and have different relative velocities with respect to the radar apparatus. For example, the receive antenna unit 100 is used to estimate a position of two obstacle A and B in which A is at 1 m and B is at 1.2 m from the radar apparatus and the relative velocity of A is 5 m/s and the relative velocity of B is 4.5 m/s. In an additional example, the receive antenna unit 100 is used to estimate a position of two obstacles that are detected in different bins of a 2D FFT grid but their signals in the 2D FFT domain interfere with each other. For example, a first obstacle which is detected in a first bin of a 2D FFT grid can have an attenuated signal representing the first obstacle in a second bin. This attenuated signal interferes with position estimation of a second obstacle detected in the second bin. In an embodiment, the receive antenna unit 100 estimates position of upto (N−1) obstacles when the linear array of antennas a1-aN has N antennas.

Figure 2A:
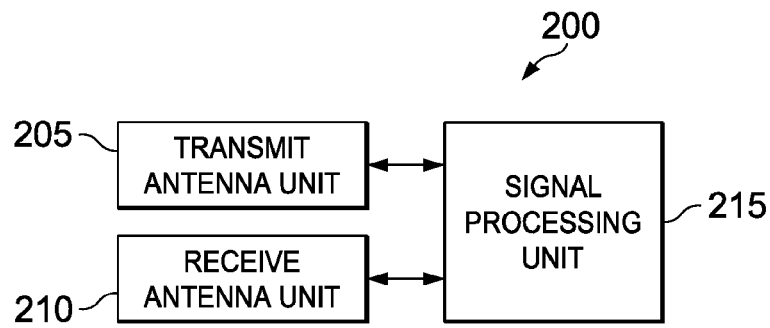
FIG. 2(a) illustrates a radar apparatus, according to an embodiment.

FIG. 2(a) illustrates a radar apparatus 200, according to an embodiment. The radar apparatus 200 includes a transmit antenna unit 205, a receive antenna unit 210 and a signal processing unit 215. The receive antenna unit 210 is similar to the receive antenna unit 100 in connection and operation. The radar apparatus 200 may include one or more additional components known to those skilled in the relevant art and are not discussed here for simplicity of the description.

The operation of the radar apparatus 200 illustrated in FIG. 2(a) is explained now. The radar apparatus 200 resolves obstacles in the dimensions of range, relative velocity and angle. To accurately estimate position of the obstacle, it is required that the obstacle is resolved in any one of these dimensions. Thus, if there are a plurality of obstacles at the same distance from the radar apparatus 200 and having same relative velocity with respect to the radar apparatus 200, the radar apparatus 200 is required to resolve these obstacles in angle dimension. The radar apparatus 200 estimates position of a plurality of obstacles at a fixed distance from the radar apparatus 200 and having fixed relative velocity with respect to the radar apparatus 200. In one embodiment, the radar apparatus 200 estimates position of a plurality of obstacles and each obstacle of the plurality of obstacles is at a different distance from the radar apparatus 200. For ease of understanding, the operation of the radar apparatus 200 is explained with the help of two obstacles in FIG. 2(b).

Figures 1, 2C:
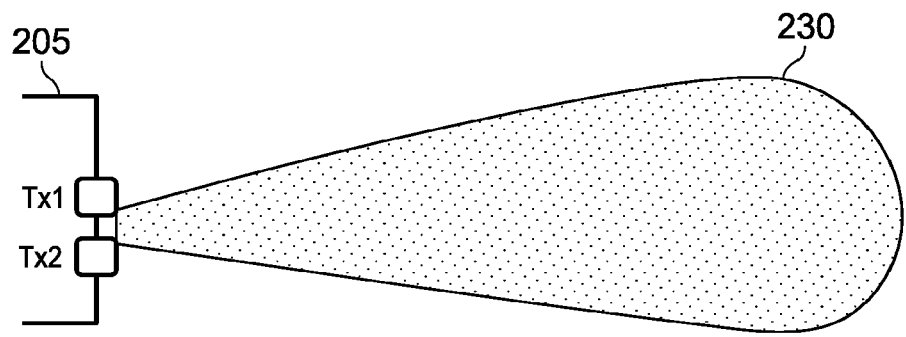
Figures 2, 2C:
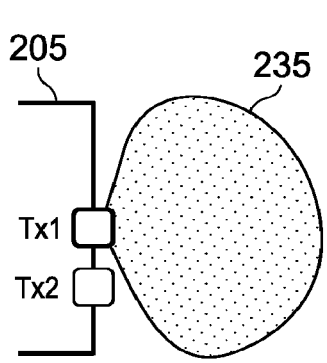
Figures 2, 2C, 3:
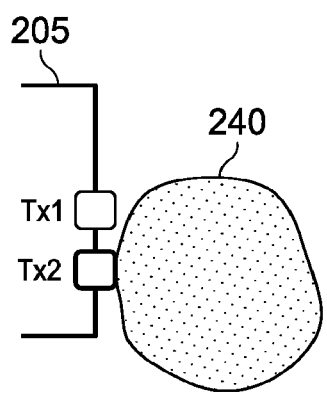
Figure 2B:
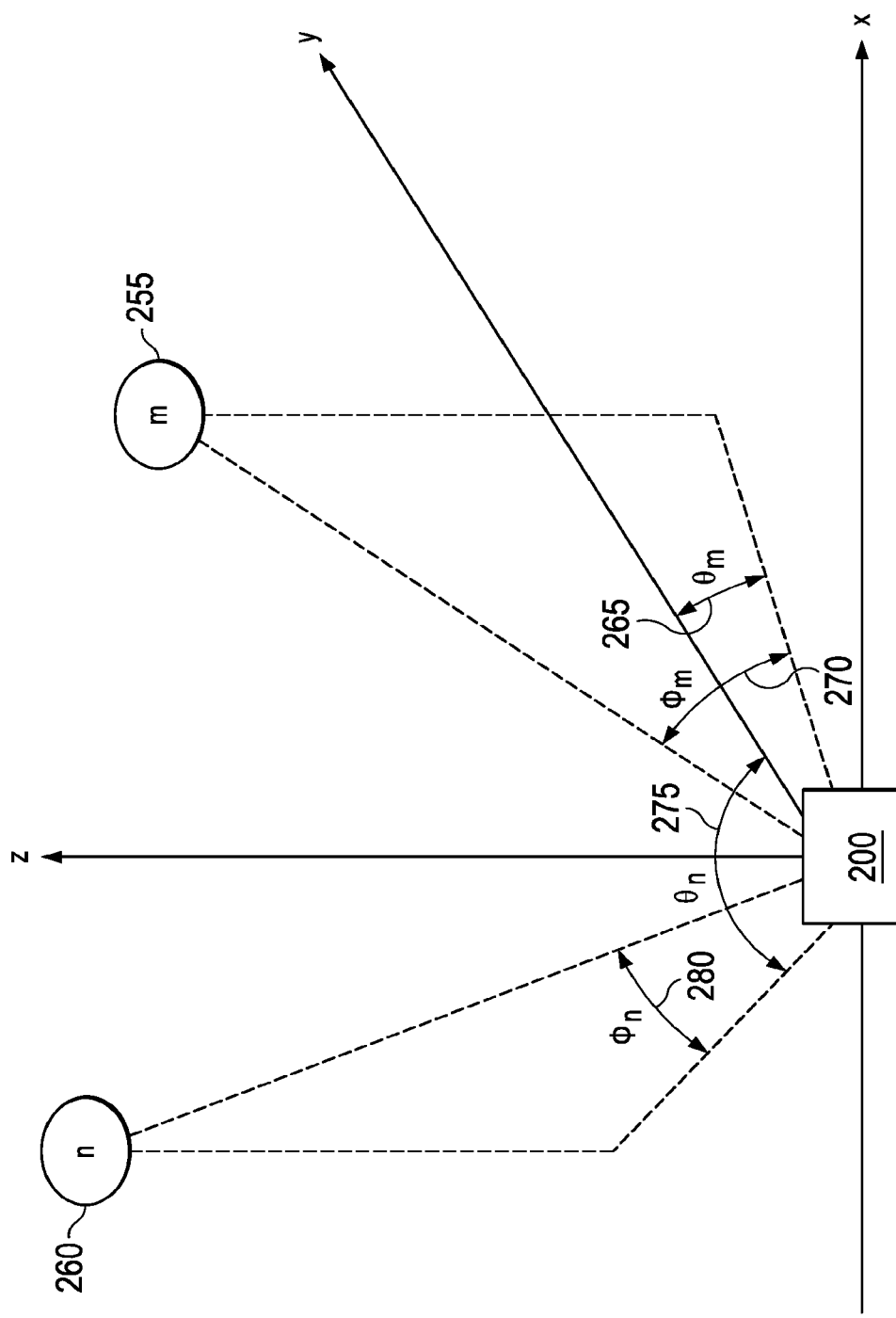
FIG. 2(b) illustrates operation of a radar apparatus, according to an embodiment
Figure 3:
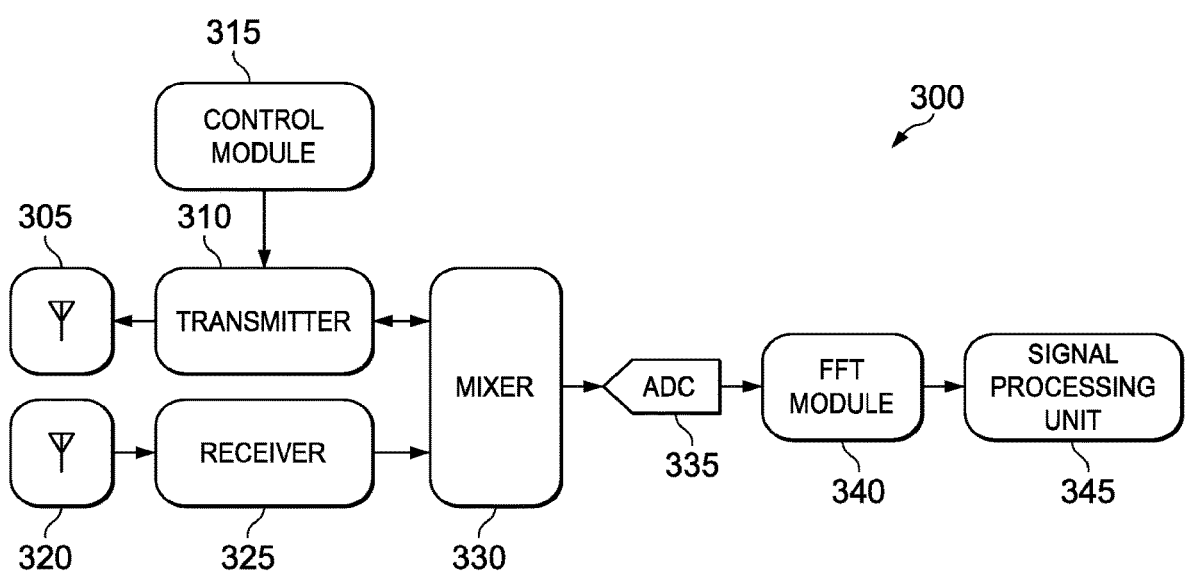

FIG. 2(b) illustrates operation of a radar apparatus 200, according to an embodiment. The operation of the radar apparatus 200 is illustrated using obstacles 'm' 255 and 'n' 260 of the plurality of obstacles. Also it is considered, that the receive antenna unit 210 (in FIG. 2a) includes three antennas a1, a2 and a3 forming the linear array of antennas and the additional antenna b1. $\theta_m$ 265 is an azimuth angle associated with the obstacle 'm' 255 and $\phi_m$ 270 is an elevation angle associated with the obstacle 'm' 255. Similarly, $\theta_n$ 275 is an azimuth angle associated with the obstacle 'n' 260 and $\phi_n$ 280 is an elevation angle associated with the obstacle 'n' 260. It is to be noted that the azimuth angle $\theta_n$ 275 as depicted in FIG. 2(b) is interpreted as an angle in negative direction.

The transmit antenna unit 205 is configured to transmit an RF (radio frequency) signal and the receive antenna unit 210 receives a scattered signal from the obstacle 'm' 255 and 'n' 260 of the plurality of obstacles. The transmitted RF signal comprises a plurality of frames of the RF signal generated by the transmitter and the received scattered RF signal comprises a plurality of frames of the signal received from the plurality of obstacles. The receive antenna unit 210 tracks signal from the plurality of obstacles at the plurality of frames and frame 'k' is one of the plurality of frames. The signal received at the receive antenna unit 210 at a frame 'k' of the plurality of frames, from the obstacles 'm' 255 and 'n' 260 is represented as:

$$\begin{bmatrix} r_{a1,k} \\ r_{a2,k} \\ r_{a3,k} \\ r_{b1,k} \end{bmatrix} = A_{m,k} \begin{bmatrix} 1 \\ e^{-jw_{xm}} \\ e^{-j2w_{xm}} \\ e^{-j\psi_m} \end{bmatrix} + A_{n,k} \begin{bmatrix} 1 \\ e^{-jw_{xn}} \\ e^{-j2w_{xn}} \\ e^{-j\psi_n} \end{bmatrix} \quad (4)$$

where $r_{a1,k}$ $r_{a2,k}$ $r_{a3,k}$ $r_{b1,k}$ are the signals received at frame k at the antennas a1, a2, a3 and b1 respectively. It is to be noted that $r_{a1,k}$ $r_{a2,5}$ $r_{a3,k}$ $r_{b1,k}$ represents signal received at the respective antennas after processing in the signal processing unit 215. For example, in an embodiment, the signal $r_{a1,k}$ depicts the signal received from the obstacle 'm' 255 and 'n' 260 at the antenna a1 for frame k after performing 2D FFT. $A_{m,k}$ and $A_{n,k}$ are the complex amplitudes of the two obstacles 'm' 255 and 'n' 260 respectively at frame k. $w_{xm}$ is an azimuth frequency associated with the obstacle 'm' 255 and $w_{xn}$ is an azimuth frequency associated with the obstacle 'n' 260. $\psi_m$ is referred to as a phase due to the obstacle 'm' 255 at the additional antenna b1 and $\psi_n$ is referred to as a phase due to the obstacle 'n' 260 at the additional antenna b1. Also, is referred to as a complex phasor associated with the obstacle 'm' 255 at the additional antenna b1 and $e^{-j\psi_n}$ is referred to as a complex phasor associated with the obstacle 'n' 260 at the additional antenna b1. The azimuth frequency $w_{xm}$ and $w_{xn}$ are defined as:

$$w_{xm} = \frac{2\pi}{\lambda} d\sin(\theta_m)\cos(\phi_m) \quad (5)$$

$$w_{xn} = \frac{2\pi}{\lambda} d\sin(\theta_n)\cos(\phi_n) \quad (6)$$

An elevation frequency ($w_{zm}$) associated with the obstacle 'm' 255 and an elevation frequency ($w_{zn}$) associated with the obstacle 'n' 260 are defined as:

$$w_{zm} = \frac{2\pi}{\lambda}\beta\sin(\phi_m) \quad (7)$$

$$w_{zn} = \frac{2\pi}{\lambda}\beta\sin(\phi_n) \quad (8)$$

The phase ($\psi_m$) due to the obstacle 'm' 255 at the additional antenna b1 and the phase ($\psi_n$) due to the obstacle 'n' 260 at the additional antenna b1are defined as:

$$\psi_m = w_{zm} + \frac{\alpha}{d}w_{xm} \quad (9)$$

$$\psi_n = w_{zn} + \frac{\alpha}{d}w_{xn} \quad (10)$$

where $\theta_m$ 265 is the azimuth angle associated with the obstacle 'm' 255 and $\phi_m$ 270 is the elevation angle associated with the obstacle 'm' 255. Similarly, $\theta_n$ 275 is the azimuth angle associated with the obstacle 'n' 260 and $\phi_n$ 280 is the elevation angle associated with the obstacle 'n' 260.

The signal processing unit 215 is configured to estimate the azimuth frequency associated with each obstacle from the signal received from the plurality of obstacles. Thus, the signal processing unit 215 estimates azimuth frequency $w_{xm}$ and $w_{xn}$ associated with obstacles 'm' 255 and 'n' 260 respectively, from the signal received from the obstacles 'm' 255 and 'n' 260 at the linear array of antennas a1, a2 and a3. The estimation of azimuth frequency is performed using one of the many methods know in the art, but not limited to, root MUSIC (multiple signal classification) method, spectral MUSIC method and methods based on maximum likelihood estimation. It is to be noted that using these methods, a radar apparatus with N antennas can estimate azimuth frequency of N−1 obstacles. The estimation provides estimated azimuth frequency $w_{xm}$ and $w_{xn}$ associated with each obstacle i.e. obstacle 'm' 255 and obstacle 'n' 260. The signal processing unit 215 estimates the complex amplitude associated with each obstacle from the estimated azimuth frequency associated with the plurality of obstacles and from the signal received from the plurality of obstacles at the linear array of antennas a1, a2 and a3. Thus, the signal processing unit 215 estimates the $A_{m,k}$ and $A_{n,k}$, the complex amplitudes of the two obstacles 'm' 255 and 'n' 260 respectively using equation 4 as follows:

$$A_{m,k}\begin{bmatrix}1\\e^{-jw_{xm}}\\e^{-2jw_{xm}}\end{bmatrix} + A_{n,k}\begin{bmatrix}1\\e^{-jw_{xn}}\\e^{-2jw_{xn}}\end{bmatrix} = \begin{bmatrix}r_{a1,k}\\r_{a2,k}\\r_{a3,k}\end{bmatrix} \quad (11)$$

$$\underbrace{\begin{bmatrix}1 & 1\\e^{-jw_{xm}} & e^{-jw_{xn}}\\e^{-2jw_{xm}} & e^{-2jw_{xn}}\end{bmatrix}}_{S}\begin{bmatrix}A_{m,k}\\A_{n,k}\end{bmatrix} = \underbrace{\begin{bmatrix}r_{a1,k}\\r_{a2,k}\\r_{a3,k}\end{bmatrix}}_{r_k(1:3)} \quad (12)$$

$$\begin{bmatrix}A_{m,k}\\A_{n,k}\end{bmatrix} = pinv(S)r_k(1:3) \quad (13)$$

where, pinv(S) is a pseudo-inverse of S. In one embodiment, pinv(S) is defined as:

$$pinv(S) = (S^HS)^{-1}S^H \quad (14)$$

where H is referred to as a conjugate transpose. Estimating pinv(S) involves inverting the 2×2 matrix ($S^HS$) as illustrated in equation 14. S is independent of the frame 'k'. Therefore, once estimated, pinv(S) is used for all the successive frames. $r_{a1,k}$ represents the signal received at antenna a1 at frame k. Similarly, $r_{a2,k}$ represents the signal received at the antenna a2 at frame k. The signal processing unit 215 uses the plurality of frames of the signal received at the linear array of antennas a1, a2 and a3 for estimating the complex amplitude associated with each obstacle. The complex amplitude is estimated for each frame of the plurality of frames. For each frame, a value of $r_k(1:3)$ is measured, which is the signal received from the obstacles 'm' 255 and 'n' 260 at the linear array of antennas a1, a2 and a3. In an embodiment, the estimate of the complex amplitudes for frame k $A_{m,k}$ and $A_{n,k}$, associated with the obstacles 'm' 255 and 'n' 260 respectively, is a least squares estimate. In another embodiment, the estimate of the complex amplitudes for frame k $A_{m,k}$ and $A_{n,k}$, associated with the obstacles 'm' 255 and 'n' 260 respectively, is a weighted least squares estimate when an SNR (signal to noise ratio) at each antenna of the linear array of antennas is different i.e. SNR at a1, a2 and a3 are different or when the SNR at any antenna of the linear array of antennas a1, a2 and a3 changes across frames. The estimation of the complex amplitudes provides estimated complex amplitudes associated with each obstacle i.e. obstacle 'm' 255 and obstacle 'n' 260 for each frame of the plurality of frames.

The signal processing unit 215 estimates the complex phasor associated with each obstacle from the estimated complex amplitude associated with the plurality of obstacles and from a signal received from the plurality of obstacles at the additional antenna. Thus, the signal processing unit 215 estimates the complex phasor $e^{-j\psi_m}$ and $e^{-j\psi_n}$ associated with the obstacle 'm' 255 and 'n' 260 respectively, from the complex amplitudes $A_{m,k}$ and $A_{n,k}$, associated with the obstacles 'm' 255 and 'n' 260 respectively and from the signal received from the obstacles 'm' 255 and 'n' 260 at the additional antenna b1. The signal processing unit 215 estimates the complex phasor $e^{-j\psi_m}$ and $e^{-j\psi_n}$ using equation 4 as follows:

$$A_{m,k}e^{jw_{zm}} + A_{n,k}e^{jw_{zn}} = r_{b1,k} \quad (15)$$

$$\underbrace{\begin{bmatrix}A_{m,1} & A_{n,1}\\A_{m,2} & A_{n,2}\\ \cdot & \cdot \\ A_{m,N_{fr}} & A_{n,N_{fr}}\end{bmatrix}}_{T}\begin{bmatrix}e^{j\psi_m}\\e^{j\psi_n}\end{bmatrix} = \underbrace{\begin{bmatrix}r_{b1,1}\\r_{b1,2}\\ \cdot \\r_{b1,N_{fr}}\end{bmatrix}}_{r_{b1}} \quad (16)$$

$$\begin{bmatrix}e^{j\psi_m}\\e^{j\psi_n}\end{bmatrix} = pinv(T)r_{b1} \quad (17)$$

where, pinv(T) is a pseudo-inverse of T. In one embodiment, pinv(T) is defined as:

$$pinv(T) = (T^HT)^{-1}T^H \quad (18)$$

where H is referred to as a conjugate transpose. Estimating pinv(T) involves inverting the 2×2 matrix ($T^HT$) illustrated in equation 18. Equation 16 represents equation 15 at the plurality of frames 'k' i.e. at k=1, 2 . . . $N_{fr}$ where $N_{fr}$ is the $N^{th}$ frame of the plurality of frames. The signal processing unit 215 uses the signal received at the additional antenna b1 across the plurality of frames for estimating the complex phasor associated with each obstacle. The signal processing unit 215 also uses the estimated complex amplitude associated with the plurality of obstacles across the plurality of frames for estimating the complex phasor associated with each obstacle. Thus, $A_{m,1}$ and $A_{n,1}$ in equation 16 represents complex amplitude because of obstacle m at frame 1 and complex amplitude because of obstacle n at frame 1 respectively. Similarly, $r_{b1,1}$ represents the signal received at the additional antenna b1 at frame 1. Similarly, $A_{m,Nfr}$ and $A_{n,Nfr}$ in equation 16 represents complex amplitude because of obstacle m at frame $N_{fr}$ and complex amplitude because of obstacle n at frame $N_{fr}$ respectively. Similarly, $r_{b1,Nfr}$ represents the signal received at the additional antenna b1 at frame $N_{fr}$. In an embodiment, the estimate of the complex phasor $e^{-j\psi_m}$ and $e^{-j\psi_n}$ associated with the obstacle 'm' 255 and 'n' 260 respectively, is a least squares estimate. In another embodiment, the estimate of the complex phasor $e^{-j\psi_m}$ and $e^{-j\psi_n}$ associated with the obstacle 'm' 255 and 'n' 260 respectively, is a weighted least squares estimate when the SNR at the additional antenna varies across the plurality of frames.

The signal processing unit 215 estimates the elevation frequency ($w_{zm}$) associated with the obstacle 'm' 255 and the elevation frequency ($w_{zn}$) associated with the obstacle 'n' 260 from the complex phasor $e^{-j\psi_m}$ and $e^{-j\psi_n}$ and from the estimated azimuth frequency $w_{xm}$ and $w_{xn}$, using the following equations:

$$w_{zm} = \text{angle}\left(e^{j\psi_m} e^{-\frac{a}{d}w_{xm}}\right) \quad (19)$$

$$w_{zn} = \text{angle}\left(e^{j\psi_n} e^{-\frac{a}{d}w_{xn}}\right) \quad (20)$$

The signal processing unit 215 is further configured to estimate the elevation angle $\phi_m$ 270 and the azimuth angle $\theta_m$ 265 associated with the obstacle 'm' 255 from the estimated elevation frequency $w_{zm}$ using equation 7 and equation 5 respectively as shown below:
From equation 7:

$$\phi_m = \sin^{-1}\left(\frac{w_{zm}}{2\pi\beta/\lambda}\right) \quad (21)$$

And from equation 5:

$$\theta_m = \sin^{-1}\left(\frac{w_{xm}}{2\pi d\cos(\phi_m)/\lambda}\right) \quad (22)$$

Similarly, the signal processing unit 215 is configured to estimate the elevation angle $\phi_n$ 280 and the azimuth angle $\theta_n$ 275 associated with the obstacle 'n' 260 from the estimated elevation frequency $w_{zn}$ using equation 8 and equation 6 respectively. The signal processing unit 215, in one embodiment, estimates the azimuth angle and the elevation angle from the estimated complex phasor associated with each obstacle and from the estimated azimuth frequency associated with each obstacle.

The radar apparatus 200 provides an efficient method to resolve the azimuth angle and elevation angle of two obstacles 'm' 255 and 'n' 260 which are at a same distance from the radar apparatus 200 and having the same relative velocity with respect to the radar apparatus 200. Also, the radar apparatus 200 require less number of antennas than the conventional methods. Some conventional methods use a 2D array of antennas while others use an L shaped antenna with a linear array of antennas in orthogonal directions to estimate the azimuth angle and the elevation angle of multiple obstacles. In contrast, with N antennas in the linear array of antennas and with one additional antenna in the receive antenna unit 210, the radar apparatus 200 is able to estimate azimuth angle and elevation angle of N−1 obstacles that are at the same range from the radar apparatus 200 and having the same relative velocity with respect to the radar apparatus 200.

Also, a processing requirement of the signal processing unit 215 in the radar apparatus 200 is low as compared to the existing radar apparatus since the method employed by the signal processing unit 215 allows for a closed form solution that do not require any search. Consequently the performance of the radar apparatus 200 is also more robust and does not suffer from performance degradation due to false peaks or missed detection of obstacles that severely effect search based solutions especially at low SNRs (signal to noise ratio). Further, this method does not require computationally intensive tasks such as finding eigenvalues and eigenvectors or inverting large matrices. The radar apparatus 200 provides an effective method to estimate the azimuth angle and the elevation angle even when an angular separation of the two obstacles 'm' 255 and 'n' 260 is small.

FIG. 2(c)-1-FIG. 2(c)-3 illustrate beam-width of a transmit antenna unit 205 in a radar apparatus. The transmit antenna unit 205 is similar in connection and operation to the transmit antenna unit 205 in the radar apparatus 200. The transmit antenna unit 205 includes a plurality of transmit antennas. For ease of understanding and not for the purpose of limitation, the transmit antenna unit 205 is shown with two transmit antenna Tx1 and Tx2.

As illustrated in FIG. 2(c)-1, the transmit antennas Tx1 and Tx2 operate together thus increasing the power and focus of the beam-width 230. Thus, the transmit antenna unit 205 provides a beam-width 230 which is narrow and has high SNR (signal to noise ratio). This arrangement is used by the radar apparatus 200 for estimating position of an obstacle of the plurality of obstacles in a first range. In an embodiment, this arrangement is used by the radar apparatus 200 for estimating position of a far-range obstacle.

As illustrated in FIG. 2(c)-2 and FIG. 2(c)-3, the transmit antennas Tx1 and Tx2 operate in a sequence i.e. first Tx1 is activated and Tx2 is inactive and then Tx1 in inactivated and Tx2 is activated. The beam-width 235 and 240 produced by Tx1 and Tx2 respectively, is wide and thus used for estimating position of an obstacle close to the radar apparatus 200 and in a wide field of view. Thus, at a given time instant, only one transmit antenna of the plurality of transmit antennas is activated. In an embodiment, at a given time instant, a set of transmit antennas of the plurality of transmit antennas is activated. The arrangement illustrated in FIG. 2(c)-2 and FIG. 2(c)-3 is used by the radar apparatus 200 for estimating position of an obstacle of the plurality of obstacles in a second range, where the first range is greater than the second range.

In an embodiment, the arrangement illustrated in FIG. 2(c)-2 and FIG. 2(c)-3 is used by the radar apparatus 200 for estimating position of a near-range obstacle, where the far-range is greater than the near-range. In an embodiment, each transmit antenna of the plurality of transmit antennas operate together to estimate position of each obstacle in a first range and each antenna in the plurality of transmit antennas operate in a sequence to estimate position of each obstacle in a second range, wherein first range is greater than the second range. The arrangements illustrated in FIG. 2(c)-2 and FIG. 2(c)-3 are used to improve de-correlation in the received signal across successive frames in the radar apparatus 200. Such de-correlation improves the angle estimation performance of the radar apparatus 200.

In an embodiment, the radar apparatus 200 is installed on a vehicle and a motion in the vehicle improves de-correlation in the radar apparatus 200. In an embodiment, the motion is specifically introduced in the vehicle to improve de-correlation in the radar apparatus 200. In an embodiment the motion introduced is of the order of the wavelength of the RF signal transmitted by the radar apparatus 200. In an embodiment the motion is a back and forth movement of the vehicle such that a change in the location of the vehicle is insignificant.

FIG. 3 illustrates a radar apparatus 300 according to an embodiment. The radar apparatus 300 includes a transmit antenna unit 305 and a receive antenna unit 320. A transmitter 310 is coupled to the transmit antenna unit 305. A control module 315 is coupled to the transmitter 310. The receive antenna unit 320 is coupled to a receiver 325. A mixer 330 is coupled to the receiver 325 and to the transmitter 310. An analog to digital converter (ADC) 335 is coupled to the mixer 330 and an FFT (fast fourier transform) module 340 is coupled to the ADC 335. A signal processing unit 345 is coupled to the FFT module 340. The radar apparatus 300 may include one or more additional components known to those skilled in the relevant art and are not discussed here for simplicity of the description.

The operation of the radar apparatus 300 illustrated in FIG. 3 is explained now. The transmit antenna unit 305 transmits an outbound RF (radio frequency) signal to a plurality of obstacles and the receive antenna unit 320 receives an inbound RF signal from the obstacle. The outbound RF signal is scattered by the plurality of obstacles to generate the inbound RF signal. The outbound RF signal includes a plurality of frames of the RF signal generated by the transmitter 310 and the inbound RF signal includes a plurality of frames of the signal received from the plurality of obstacles. The control module 315 provides a control signal to the transmitter 310. The transmitter 310 generates the outbound RF signal and the receiver 325 receives the inbound RF signal from the receive antenna unit 320.

In one embodiment, the transmit antenna unit 305 includes one or more transmit antennas coupled to the transmitter 310. The transmit antenna unit 305 is analogous to the transmit antenna unit 205 in the radar apparatus 200 in operation. The transmit antenna unit 305 thus includes a plurality of transmit antennas and each transmit antenna of the plurality of transmit antennas operate together to estimate position of each obstacle in a first range and each antenna in the plurality of transmit antennas operate in a sequence to estimate position of each obstacle in a second range, wherein first range is greater than the second range. In an embodiment, the receive antenna unit 320 includes one or more antennas coupled to the receiver 325.

In an embodiment, the receive antenna unit 320 is analogous to the receive antenna unit 210 and thus includes a linear array of antenna and an additional antenna at a predefined offset from at least one antenna in the linear array of antennas. In an embodiment, each antenna in the linear array of antenna and the additional antenna has a separate receiver path comprising receiver, mixer and ADC. Each receiver path is coupled to the signal processing unit 345.

The mixer 330 receives the inbound RF signal from the receiver 325 and generates a demodulated signal. The ADC 335 receives the demodulated signal from the mixer 330 and generates a digital signal in response to the demodulated signal. The FFT module 340 receives the digital signal from the ADC 335 and is configured to transform the digital signal from a time domain to a frequency domain. The signal processing unit 345 is configured to process the digital signal received from the FFT module 340. The signal processing unit 345 is analogous to the signal processing unit 215 in operation. The signal processing unit 345 is used in estimating position of a plurality of obstacles at a fixed distance from the radar apparatus 300 and having the same relative velocity with respect to the radar apparatus 300. In one example, the receive antenna unit 100 is used to estimate the position of a plurality of obstacles which are at different distances and have different relative velocities with respect to the radar apparatus 300. For example, the receive antenna unit 320 is used to estimate a position of two obstacle A and B in which A is at 1 m and B is at 1.2 m from the radar apparatus and the relative velocity of A is 5 m/s and the relative velocity of B is 4.5 m/s. In an additional example, the receive antenna unit 320 is used to estimate a position of two obstacles that are detected in different bins of a 2D FFT grid but their signals in the 2D FFT domain interfere with each other. For example, a first obstacle which is detected in a first bin of a 2D FFT grid can have an attenuated signal representing the first obstacle in a second bin. This attenuated signal interferes with position estimation of a second obstacle detected in the second bin. The signal processing unit 345 estimates an azimuth angle and an elevation angle associated with each obstacle of the plurality of obstacle in the same manner as performed by the signal processing unit 215. The signal processing unit 345 estimates an azimuth frequency, a complex amplitude and a complex phasor associated with each obstacle by processing the digital signal received from the FFT module 340 using the same method as used by the signal processing unit 215. Thus, the plurality of frames of the signal received from the plurality of obstacles at the linear array of antennas in the receive antenna unit 320 is used for estimating the azimuth frequency and the complex amplitude associated with each obstacle and the plurality of frames of the signal received from the plurality of obstacles at the additional antenna in the receive antenna unit 320 is used for estimating the complex phasor associated with each obstacle. This process is explained earlier with reference to FIG. 2(a) and therefore is not included herein for sake of brevity of description. In one example, all the components of the radar apparatus 300 are integrated on a chip. In another example, all the components of the radar apparatus 300 except the signal processing unit 350 are integrated on a chip.

The radar apparatus 300 provides an efficient method to resolve the azimuth angle and elevation angle of two obstacles 'm' 255 and 'n' 260 of the plurality of obstacles, when 'm' 255 and 'n' 260 are at a same distance from the radar apparatus 300 and having the same relative velocity with respect to the radar apparatus 300. Also, the radar apparatus 300 require less number of antennas than the conventional methods. With N antennas in the linear array of antennas and one additional antenna in the receive antenna unit 320, the radar apparatus 300 is able to detect N−1 obstacles that are at the same range from the radar apparatus 300 and having the same relative velocity with respect to the radar apparatus 300.

The radar apparatus 300 also estimates the azimuth angle and elevation angle of these N−1 obstacles. Also, a processing requirement of the signal processing unit 345 in the radar apparatus 300 is low as compared to the conventional radar apparatus since the signal processing unit 345 does not require any search, inversion of large matrices or finding eigenvalues and eigenvectors for estimating azimuth and elevation angles. The method of estimating the azimuth angle and the elevation angle in the signal processing unit 345 is less complex and also does not suffer from performance degradation due to false peaks/missed detection of obstacles that severely effect search based solutions especially at low SNRs (signal to noise ratio).

The radar apparatus 300 provides an effective method to estimate the azimuth angle and the elevation angle even when an angular separation of the two obstacles 'm' 255 and 'n' 260 is small. The transmit antenna unit 305 includes a plurality of transmit antennas. Each transmit antenna of the plurality of transmit antennas operate together to estimate position of each obstacle in a first range and each antenna in the plurality of transmit antennas operate in a sequence to estimate position of each obstacle in a second range, wherein first range is greater than the second range. This improves de-correlation of signals received at the receive antenna unit 320 in the radar apparatus 300 and thus improves angle estimation performance.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections. Also, the terms "inactivation" or "inactivated" or turn "OFF" or turned "OFF" is used to describe a deactivation of a device, a component or a signal. The terms "activation" or "activated" or turned "ON" describes activation of a device, a component or a signal.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. An apparatus comprising:
    a receive antenna unit, the receive antenna unit comprising:
        a linear array of antennas; and
    a signal processing unit, the signal processing unit configured to:
        estimate a frequency associated with an obstacle from a signal received from the obstacle at the linear array of antennas;
        estimate an amplitude associated with the obstacle from the estimated frequency associated with the obstacle and from the signal received from the obstacle at the linear array of antennas;
        estimate a phasor associated with the obstacle from the estimated amplitude associated with the obstacle and from a signal received from the obstacle at the linear array of antennas; and
        estimate an azimuth angle and an elevation angle associated with the obstacle from the estimated phasor associated with the obstacle and from the estimated frequency associated with the obstacle.

2. The apparatus of claim 1, wherein the obstacle has a fixed distance and a fixed relative velocity with respect to the apparatus.

3. The apparatus of claim 1, wherein the estimate of amplitude associated with the obstacle is one of a least squares estimate and a weighted least squares estimate.

4. The apparatus of claim 1, wherein the estimate of the phasor associated with the obstacle is one of a least squares estimate and a weighted least squares estimate.

5. A method comprising:
    estimating, at a radar apparatus, a frequency associated with an obstacle based on a signal received from the obstacle;
    estimating, at the radar apparatus, an amplitude associated with the obstacle based on the estimated frequency associated with the obstacle and the signal received from the obstacle;
    estimating, at the radar apparatus, a phasor associated with the obstacle based on the estimated amplitude associated with the obstacle and the signal received from the obstacle; and
    estimating, at the radar apparatus, an azimuth angle and an elevation angle associated with the obstacle based on the estimated phasor associated with the obstacle and the estimated frequency associated with the obstacle.

6. The method of claim 5, wherein the radar apparatus comprises a receive antenna unit, the receive antenna unit further comprising:
    a linear array of antennas.

7. The method of claim 5, wherein estimating the frequency further comprises estimating the frequency associated with the obstacle based on a signal received from the obstacle.

8. The method of claim 5, wherein estimating the amplitude further comprises estimating the amplitude associated with the obstacle based on the estimated frequency associated with the obstacle and the signal received from the obstacle.

9. The method of claim 5, wherein estimating the phasor further comprises estimating the phasor associated with the obstacle based on the estimated amplitude associated with the obstacle and the signal received from the obstacle.

10. The method of claim 5, wherein:
    the estimate of amplitude associated with the obstacle is one of a least squares estimate and a weighted least squares estimate; and
    the estimate of the phasor associated with the obstacle is one of a least squares estimate and a weighted least squares estimate.

11. An apparatus comprising:
    a transmitter configured to generate an outbound RF (radio frequency) signal;
    a receiver configured to receive an inbound RF signal, wherein the outbound RF signal is scattered an obstacle to generate the inbound RF signal;

a mixer coupled to the receiver and to the transmitter and configured to demodulate the inbound RF signal to generate a demodulated signal;

an analog to digital converter (ADC) coupled to the mixer and configured to generate a digital signal in response to the demodulated signal received from the mixer;

an FFT (Fast Fourier Transform) module coupled to the ADC and configured to transform the digital signal from a time domain to a frequency domain; and a signal processing unit coupled to the FFT module and configured to process the digital signal, the signal processing unit further configured to:

estimate a frequency associated with an obstacle based on the digital signal;

estimate an amplitude associated with the obstacle based on the estimated frequency associated with the obstacle and the digital signal;

estimate a phasor associated with the obstacle based on the estimated amplitude associated with the obstacle; and estimate an azimuth angle and an elevation angle associated with the obstacle based on the estimated phasor associated with the obstacle and the estimated frequency associated with the obstacle.

12. The apparatus of claim 11, wherein the receiver further comprises:

a linear array of antennas; and an additional antenna at a predefined offset from at least one antenna in the linear array of antennas.

13. The apparatus of claim 12, wherein the phasor associated with the obstacle is estimated based on a signal received from the obstacle at the additional antenna and based on the estimated amplitude associated with the obstacle.

14. The apparatus of claim 11, wherein the outbound RF signal comprises a plurality of frames and the inbound RF signal comprises a plurality of frames.

* * * * *